US012132508B2

(12) United States Patent
Tahara et al.

(10) Patent No.: US 12,132,508 B2
(45) Date of Patent: Oct. 29, 2024

(54) RADIO-FREQUENCY CIRCUIT AND COMMUNICATION DEVICE

(71) Applicant: Murata Manufacturing Co., Ltd., Kyoto (JP)

(72) Inventors: Kenji Tahara, Kyoto (JP); Takahiro Eguchi, Kyoto (JP); Hiroyuki Nagamori, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 358 days.

(21) Appl. No.: 17/805,498

(22) Filed: Jun. 6, 2022

(65) Prior Publication Data

US 2022/0311455 A1  Sep. 29, 2022

Related U.S. Application Data

(63) Continuation of application No. PCT/JP2020/040916, filed on Oct. 30, 2020.

(30) Foreign Application Priority Data

Feb. 28, 2020  (JP) ................................. 2020-033830

(51) Int. Cl.
*H04W 4/00* (2018.01)
*H04B 1/00* (2006.01)
(52) U.S. Cl.
CPC ........... *H04B 1/006* (2013.01); *H04B 1/0057* (2013.01); *H04B 1/0064* (2013.01)
(58) Field of Classification Search
CPC ..... H04W 88/06; H04B 1/006; H04B 1/0053; H04B 1/0057; H04B 1/00
See application file for complete search history.

(56) References Cited

U.S. PATENT DOCUMENTS

2005/0277387 A1* 12/2005 Kojima ................. H01Q 21/28
455/562.1
2016/0380652 A1   12/2016 Anthony et al.
(Continued)

FOREIGN PATENT DOCUMENTS

JP    2017-11533 A    1/2017
JP    2017-017691 A   1/2017
(Continued)

OTHER PUBLICATIONS

International Search Report issued in International Application No. PCT/JP 2020/040916 dated Dec. 22, 2022.
(Continued)

*Primary Examiner* — Omoniyi Obayanju
(74) *Attorney, Agent, or Firm* — Pearne & Gordon LLP

(57) ABSTRACT

The sensitivity of a reception filter for receiving a reception signal in a second frequency band corresponding to the 4G or 5G standard is prevented from being degraded by a harmonic of a third transmission signal in a third frequency region corresponding to the 4G or 5G standard. A radio-frequency circuit includes an antenna terminal, a relay terminal, a transmission filter, a reception filter, a variable low-pass filter, and a switch. A first transmission signal in a first frequency band is input to the relay terminal. In communication using the first frequency band, the variable low-pass filter passes the first transmission signal input via the relay terminal. When another harmonic circuit performs communication using the third frequency band, the variable low-pass filter attenuates, among harmonics of the third transmission signal in the third frequency band, a harmonic input via the relay terminal.

16 Claims, 3 Drawing Sheets

(56) References Cited

U.S. PATENT DOCUMENTS

2016/0381648 A1 12/2016 Tanaka et al.
2017/0026136 A1 1/2017 Thompson et al.
2020/0395972 A1 12/2020 Matsumoto

FOREIGN PATENT DOCUMENTS

| JP | 2017-028699 A | 2/2017 |
| WO | 2014/075099 A1 | 5/2014 |
| WO | 2019/188968 A1 | 10/2019 |

OTHER PUBLICATIONS

Balteanu, F., "RF Front End Module Architectures for 5G", 2019 IEEE BiCMOS and Compound semiconductor Integrated Circuits and Technology Symposium, Jan. 2020.
Skyworks Solutions, Inc., "Sky78191-11 SkyOne Low Band Tx-Rx Front-End Module or 3G / 4G / 5G Applications with Low Band/ High Band 2G", Sep. 25, 2019.

* cited by examiner

RADIO-FREQUENCY CIRCUIT AND COMMUNICATION DEVICE

CROSS REFERENCE TO RELATED APPLICATION

This is a continuation of International Application No. PCT/JP2020/040916 filed on Oct. 30, 2020 which claims priority from Japanese Patent Application No. 2020-033830 filed on Feb. 28, 2020. The contents of these applications are incorporated herein by reference in their entireties.

BACKGROUND ART

Technical Field

The present disclosure generally relates to radio-frequency circuits and communication devices, and, more specifically, to a radio-frequency circuit and a communication device capable of supporting the 2G (2nd generation mobile communication system) standard, the 4G (4th generation mobile communication system) standard, and the 5G (5th generation mobile communication system) standard.

Electronic systems that use carrier aggregation have been known (see, for example, Patent Document 1).

FIG. 2B in Patent Document 1 illustrates a single antenna, a single diplexer, two antenna switches, eight duplexers, two band selection switches, two directional couplers, and two power amplifiers.

In the above electronic system, the diplexer and the antenna are connected. In the above electronic system, each of the two power amplifiers is connected to corresponding one of the band selection switches via corresponding one of the two directional couplers.

Patent Document 1: Japanese Unexamined Patent Application Publication No. 2017-17691

BRIEF SUMMARY

The present disclosure provides a radio-frequency circuit and a communication device with which the sensitivity of a reception filter for receiving a reception signal in a second frequency band corresponding to the 4G or 5G standard is prevented from being degraded by the harmonic of a third transmission signal in a third frequency region corresponding to the 4G or 5G standard.

A radio-frequency circuit according to an aspect of the present disclosure performs communication using a first frequency band corresponding to a 2G standard and communication using a second frequency band corresponding to a 4G or 5G standard. The radio-frequency circuit includes an antenna terminal, a relay terminal, a transmission filter, a reception filter, a variable low-pass filter, and a switch. A first transmission signal in the first frequency band is input to the relay terminal. The transmission filter is configured to pass a second transmission signal in the second frequency band. The reception filter is configured to pass a reception signal in the second frequency band. The variable low-pass filter has a changeable passband. The switch can switch a state in which the variable low-pass filter is connected to the antenna terminal and a state in which the transmission filter is connected to the antenna terminal. In the communication using the first frequency band, the variable low-pass filter passes the first transmission signal input via the relay terminal. When another harmonic circuit performs communication using a third frequency band, the variable low-pass filter attenuates, among harmonics of a third transmission signal in the third frequency band which are generated when the third transmission signal is transmitted, a harmonic input via the relay terminal. The third frequency band is lower than the first frequency band and that corresponds to the 4G or 5G standard.

A communication device according to an aspect of the present disclosure includes the radio-frequency circuit and the other radio-frequency circuit.

With a radio-frequency circuit and a communication device according to an aspect of the present disclosure, the sensitivity of a reception filter for receiving a reception signal in a second frequency band corresponding to the 4G or 5G standard can be prevented from being degraded by the harmonic of a third transmission signal in a third frequency region corresponding to the 4G or 5G standard.

DETAILED DESCRIPTION

Embodiment

Figure 1:
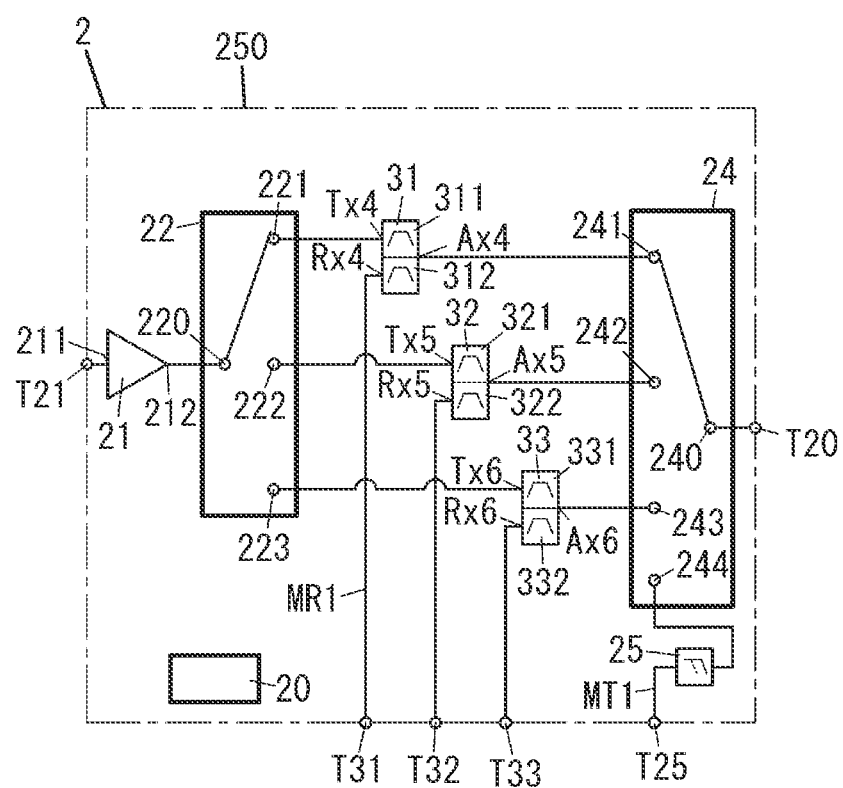
FIG. 1 is a circuit diagram of a radio-frequency circuit according to an embodiment.

A radio-frequency circuit according to an embodiment and a communication device according to an embodiment will be described below with reference to drawings. Drawings referred to in the following embodiment are all schematic drawings, and the ratios between the sizes, thicknesses, and so forth of constituent elements in the drawings do not necessarily reflect the actual dimensional ratios.

(1) Configuration of Radio-Frequency Circuit and Communication Device

First, the configurations of a radio-frequency circuit 2 according to an embodiment and a communication device 400 according to an embodiment will be described with reference to FIGS. 1 and 2.

The radio-frequency circuit 2 according to this embodiment includes a radio-frequency front-end circuit 250, which is to be included in, for example, a multi-band mobile communication device (e.g., a mobile phone) supporting simultaneous use of two frequency bands (e.g., carrier aggregation). The radio-frequency circuit 2 is a module that can support, along with a radio-frequency circuit 1, carrier aggregation for the mid-band specified by the 4G (4th generation mobile communication system) standard and the low band specified by the 4G standard. However, the radio-frequency circuit 2 may be a module that can support, along with the radio-frequency circuit 1, dual connectivity for the mid-band specified by the 5G (5th generation mobile communication system) standard and the low band specified by the 4G standard.

The 2G standard is, for example, the GSM® (global system for mobile communications) standard. The 4G standard is, for example, the 3GPP LTE (long term evolution) standard. The 5G standard is, for example, 5G NR (new radio). The low band specified by the GSM® standard includes GSM 850 and GSM 900. The mid-band specified by the GSM® standard includes GSM 1800 and GSM 1900. The low band specified by the 3GPP LTE standard includes, for example, Band 8. Band 8 covers a downlink frequency band of 925 to 960 MHz and an uplink frequency band of 880 to 915 MHz.

The communication device 400 including the radio-frequency circuit 2 can support carrier aggregation in which a plurality of (two in an embodiment) frequency bands are simultaneously used for downlink (downlink carrier aggregation). The communication device 400 including the radio-frequency circuit 2 can also support carrier aggregation in which a plurality of (two in an embodiment) frequency bands are simultaneously used for uplink (uplink carrier aggregation). The mid-band specified by the 3GPP LTE standard includes, for example, Band 3. Band 3 covers a downlink frequency band of 1805 to 1880 MHz and an uplink frequency band of 1710 to 1785 MHz. The communication device 400 including the radio-frequency circuit 2 may be capable of supporting the above dual connectivity instead of the carrier aggregation. In this case, the mid-band specified by the 5G NR includes, for example, n3. The n3 band covers a downlink frequency band of 1805 to 1880 MHz and an uplink frequency band of 1710 to 1785 MHz.

(2) Constituent Elements in Radio-Frequency Circuit

As illustrated in FIG. 1, the radio-frequency circuit 2 according to this embodiment includes a fourth power amplifier 21, a plurality of (three in the drawing) mid-band duplexers 31, 32, and 33, and a variable low-pass filter 25. The radio-frequency circuit 2 also includes a mid-band band change-over switch 22 and a mid-band antenna switch (switch) 24. The radio-frequency circuit 2 has a mid-band antenna terminal (antenna terminal) T20, a mid-band signal input terminal T21, and a plurality of (three in the drawing) mid-band signal output terminals T31, T32, and T33. The radio-frequency circuit 2 also includes a mid-band transmission path MT1 and a relay terminal T25 connected to the mid-band transmission path MT1. The radio-frequency circuit 2 also includes a control circuit 20.

Figure 2:
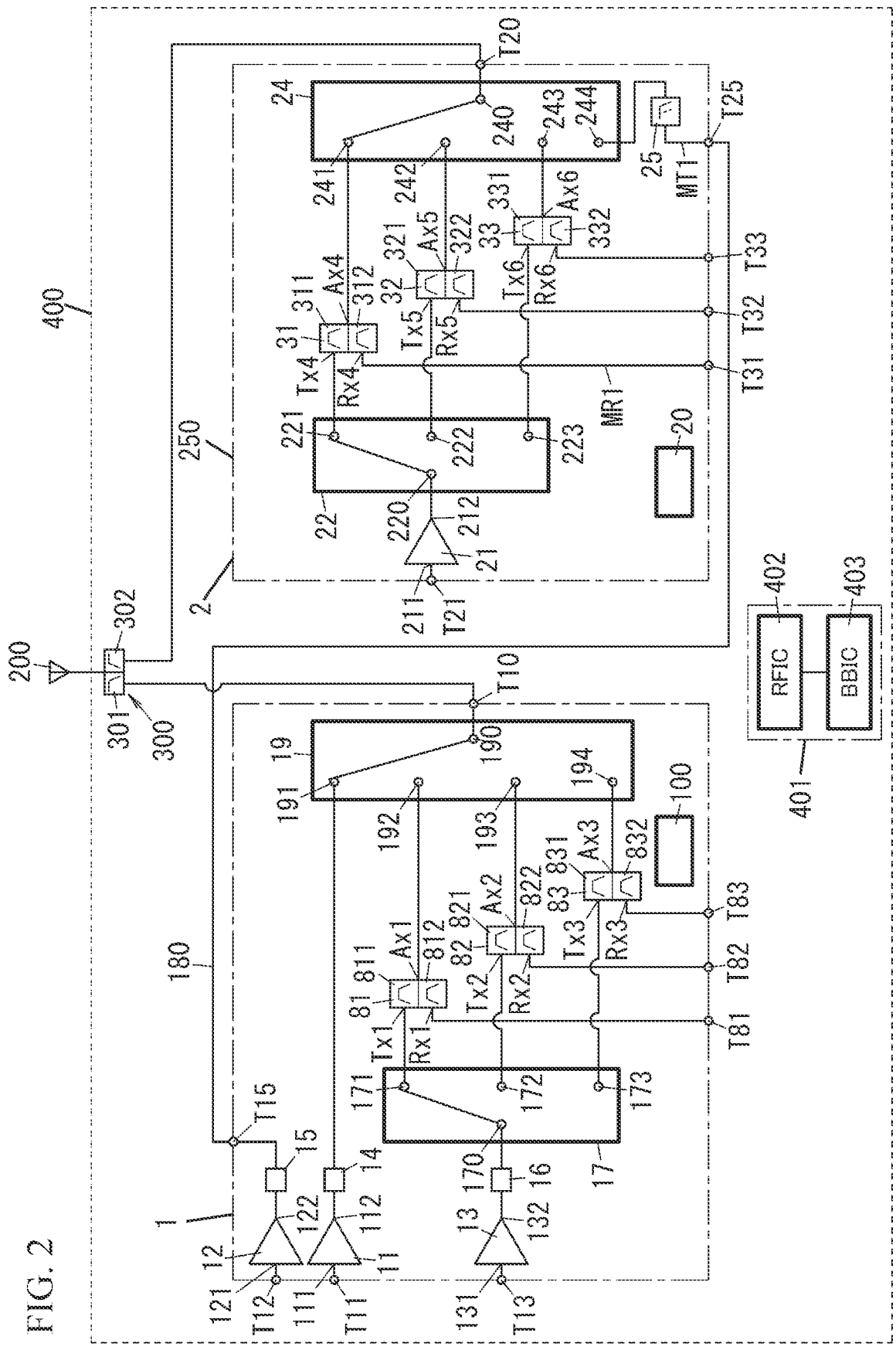
FIG. 2 is a circuit diagram of a communication device including the radio-frequency circuit.

As illustrated in FIG. 2, the radio-frequency circuit 2 according to this embodiment is connected to a mid-band filter 302 in a diplexer 300. Accordingly, the radio-frequency circuit 2 is connected to an antenna 200 via the mid-band filter 302.

In this specification, the expression "some things are connected" means that two connection targets are electrically connected. In addition, in this specification, the expression "some things are electrically connected" includes the case where two connection targets are directly electrically connected and the case where two connection targets are indirectly electrically connected.

(2.1) Power Amplifier

The fourth power amplifier 21 has a fourth input terminal 211 and a fourth output terminal 212. The fourth power amplifier 21 receives the input of a second transmission signal in the mid-band specified by the 4G or 5G standard via the fourth input terminal 211, amplifies the second transmission signal, and outputs the second transmission signal from the fourth output terminal 212. The second transmission signal is a transmission signal in a second frequency band corresponding to the 4G or 5G standard. The fourth input terminal 211 of the fourth power amplifier 21 is connected to the mid-band signal input terminal T21.

The frequency band (second frequency band) of the second transmission signal includes, for example, the frequency band of Band 3 specified by the LTE standard.

(2.2) Antenna Switch

The mid-band antenna switch 24 is provided between the fourth output terminal 212 of the fourth power amplifier 21 and the mid-band antenna terminal T20. More specifically, the mid-band antenna switch 24 is provided between the mid-band antenna terminal T20 and each of the multiple (three in the drawing) mid-band duplexers 31 to 33.

The mid-band antenna switch 24 has a single common terminal 240 and a plurality of (four in the drawing) selection terminal 241 to 244. The common terminal 240 is connected to the mid-band antenna terminal T20. In the mid-band antenna switch 24, the three selection terminals 241 to 243 of the four selection terminals 241 to 244 are connected to the mid-band duplexers 31 to 33, respectively and the other selection terminal 244 is connected to the relay terminal T25 via the mid-band transmission path MT1.

The mid-band antenna switch 24 is, for example, a switch IC (integrated circuit). The mid-band antenna switch 24 provides, for example, the isolation of approximately 20 dB to 30 dB.

(2.3) Signal Path

The mid-band transmission path MT1 is connected to the mid-band antenna switch 24 via the variable low-pass filter 25 and is connected to a bypass terminal T15 of the radio-frequency circuit 1. More specifically, the mid-band transmission path MT1 is connected to the bypass terminal T15 of the radio-frequency circuit 1 via the relay terminal T25.

(2.4) Duplexer

The multiple (three in the drawing) mid-band duplexers 31, 32, and 33 include transmission filters 311, 321, and 331 and reception filters 312, 322, and 332, respectively. The mid-band duplexer 31 has an antenna-side terminal Ax4, a transmission terminal Tx4, and a reception terminal Rx4. The mid-band duplexer 32 has an antenna-side terminal Ax5, a transmission terminal Tx5, and a reception terminal Rx5. The mid-band duplexer 33 has an antenna-side terminal Ax6, a transmission terminal Tx6, and a reception terminal Rx6.

Each of the transmission filters 311, 321, and 331 passes signals in a transmission frequency band and attenuates signals in frequency bands other than the transmission frequency band. Each of the reception filters 312, 322, and 332 passes signals in a reception frequency band and attenuates signals in frequency bands other than the reception frequency band. The transmission filters 311, 321, and 331 and the reception filters 312, 322, and 332 are, for example, SAW (surface acoustic wave) filters. The multiple mid-band duplexers 31, 32, and 33 have different transmission frequency bands and different reception frequency bands.

In this embodiment, the mid-band duplexer 31 supports the 4G or 5G standard and is provided for, for example, Band 3 specified by the LTE standard or for the n3 band specified by the 5G NR. The radio-frequency circuit 2 includes a mid-band reception path MR1 that is a signal path between the mid-band antenna switch 24 and the mid-band signal output terminal T31. Accordingly, the communication device 400 can support the downlink carrier aggregation for Band 8 and Band 3 or the dual connectivity for the n8 band and Band 3.

The mid-band duplexer 32 supports the 4G or 5G standard and is provided for, Band 1 specified by the LTE standard. The mid-band duplexer 33 supports the 4G or 5G standard and is provided for, for example, Band 2 specified by the LTE standard.

The input terminal of the transmission filter 311 is used as the transmission terminal Tx4 in the mid-band duplexer 31 and is connected to a selection terminal 221 of the mid-band band change-over switch 22. The input terminal of the transmission filter 321 is used as the transmission terminal Tx5 in the mid-band duplexer 32 and is connected to a selection terminal 222 of the mid-band band change-over switch 22. The input terminal of the transmission filter 331 is used as the transmission terminal Tx6 in the mid-band duplexer 33 and is connected to a selection terminal 223 of the mid-band band change-over switch 22. The output terminal of the reception filter 312 is used as the reception terminal Rx4 in the mid-band duplexer 31 and is connected to the mid-band signal output terminal T31. The output terminal of the reception filter 322 is used as the reception terminal Rx5 in the mid-band duplexer 32 and is connected to the mid-band signal output terminal T32. The output terminal of the reception filter 332 is used as the reception terminal Rx6 in the mid-band duplexer 33 and is connected to the mid-band signal output terminal T33.

A terminal (ANT terminal) connected to the output terminal of the transmission filter 311 and the input terminal of the reception filter 312 is used as the antenna-side terminal Ax4 in the mid-band duplexer 31 and is connected to the selection terminal 241 of the mid-band antenna switch 24. A terminal (ANT terminal) connected to the output terminal of the transmission filter 321 and the input terminal of the reception filter 322 is used as the antenna-side terminal Ax5 in the mid-band duplexer 32 and is connected to the selection terminal 242 of the mid-band antenna switch 24. A terminal (ANT terminal) connected to the output terminal of the transmission filter 331 and the input terminal of the reception filter 332 is used as the antenna-side terminal Ax6 in the mid-band duplexer 33 and is connected to the selection terminal 243 of the mid-band antenna switch 24.

(2.5) Variable Low-Pass Filter

Figure 3:
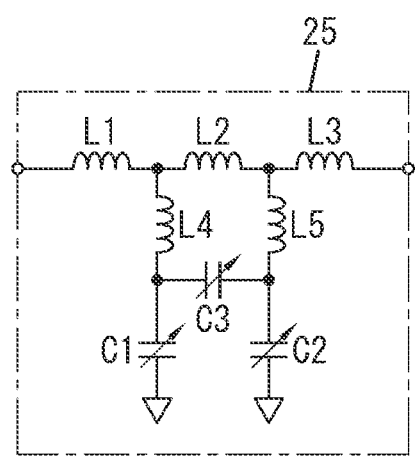
FIG. 3 is a circuit diagram of a variable low-pass filter used in the radio-frequency circuit.

As illustrated in FIG. 3, the variable low-pass filter 25 includes a plurality of (five in the drawing) inductors L1 to L5 and a plurality of (three in the drawing) variable capacitors C1 to C3.

A first end of the inductor L1 is connected to the relay terminal T25, and a second end of the inductor L1 is connected to the selection terminal 244 of the mid-band antenna switch 24 via the series circuit including the inductors L2 and L3.

In the variable low-pass filter 25, a series circuit including the inductor L4 and the variable capacitor C1 is connected between the ground and the node between the inductors L1 and L2. In the example illustrated in FIG. 3, the inductor L4 is located near the node between the inductors L1 and L2 and the variable capacitor C1 is located near the ground.

In the variable low-pass filter 25, a series circuit including the inductor L5 and the variable capacitor C2 is connected between the ground and the node between the inductors L2 and L3. In the example illustrated in FIG. 3, the inductor L5 is located near the node between the inductors L2 and L3 and the variable capacitor C2 is located near the ground.

In the variable low-pass filter 25, the variable capacitor C3 is connected between the node between the inductor L4 and the variable capacitor C1 and the node between the inductor L5 and the variable capacitor C2.

The variable capacitors C1 to C3 are, for example, variable capacitors (VACs). The electrostatic capacitance of each of the variable capacitors C1 to C3 varies depending on, for example, a voltage that the control circuit 20 to be described below applies thereto. In the variable low-pass filter 25, the cut-off frequency of a transmission signal passing through the variable low-pass filter 25 can be changed by changing the electrostatic capacitances of the variable capacitors C1 to C3.

(2.6) Band Change-Over Switch

The mid-band band change-over switch 22 is provided between the fourth output terminal 212 of the fourth power amplifier 21 and each of the transmission terminal Tx4 of the mid-band duplexer 31, the transmission terminal Tx5 of the mid-band duplexer 32, and the transmission terminal Tx6 of the mid-band duplexer 33. The mid-band band change-over switch 22 connects one of the multiple mid-band duplexers 31, 32, and 33 to the fourth output terminal 212 of the fourth power amplifier 21.

(2.7) Signal Terminal

As illustrated in FIG. 1, the multiple (three in the drawing) mid-band signal output terminals T31, T32, and T33 are connected to the reception terminals Rx4, Rx5, and Rx6 of the mid-band duplexers 31, 32, and 33, respectively.

(2.8) Control Circuit

The control circuit 20 causes the mid-band antenna switch 24 to switch between connections such that one of the multiple mid-band duplexers 31, 32, and 33 and the mid-band transmission path MT1 is connected to the mid-band filter 302 in the diplexer 300. The control circuit 20 is, for example, an IC (integrated circuit).

(3) Constituent Elements in Communication Device

As illustrated in FIG. 2, the communication device 400 according to this embodiment includes the radio-frequency circuit 1 (hereinafter also referred to as a "first radio-frequency circuit 1") and the radio-frequency circuit 2 (hereinafter also referred to as a "second radio-frequency circuit 2"). In this embodiment, the communication device 400 further includes the diplexer 300 and a signal processing circuit 401. In this embodiment, the communication device 400 further includes a bypass path 180. The radio-frequency circuit 2 (second radio-frequency circuit 2) has been described in "(2) Constituent Elements in Radio-frequency Circuit", and the description thereof will be omitted.

(3.1) Diplexer

The diplexer 300 includes a low-band filter 301 and a mid-band filter 302. The diplexer 300 is connected to the antenna 200. The low-band filter 301 is, for example, a low-pass filter. The mid-band filter 302 is, for example, a high-pass filter.

(3.2) First Radio-Frequency Circuit

The first radio-frequency circuit 1 (another radio-frequency circuit) is connected to the low-band filter 301 in the diplexer 300. Accordingly, the first radio-frequency circuit 1 is connected to the antenna 200 via the low-band filter 301.

As illustrated in FIG. 2, the first radio-frequency circuit 1 includes a first power amplifier 11, a second power amplifier 12, a third power amplifier 13, a first matching circuit 14, a second matching circuit 15, and a third matching circuit 16. The first radio-frequency circuit 1 also includes a plurality of (three in the drawing) duplexers 81, 82, and 83, a low-band band change-over switch 17, and a low-band antenna switch 19. The first radio-frequency circuit 1 has a low-band antenna terminal T10, a low-band first signal input terminal T11, a mid-band signal input terminal T12, and a low-band second signal input terminal T13. The first radio-frequency circuit 1 also has a bypass terminal T15 and a plurality of (three in the drawing) low-band signal output terminals T81, T82, and T83. The first radio-frequency circuit 1 also includes a control circuit 100.

(3.2.1) Power Amplifier

The first power amplifier 11 has a first input terminal 111 and a first output terminal 112. The first power amplifier 11 receives the input of a fourth transmission signal in the low band specified by the 2G standard via the first input terminal 111, amplifies the fourth transmission signal, and outputs the fourth transmission signal from the first output terminal 112. The fourth transmission signal is a transmission signal in a fourth frequency band corresponding to the 2G standard.

The first input terminal 111 is connected to the low-band first signal input terminal T11. The first output terminal 112 is connected to the first matching circuit 14.

The second power amplifier 12 has a second input terminal 121 and a second output terminal 122. The second power amplifier 12 receives the input of a first transmission signal in the mid-band specified by the 2G standard via the second input terminal 121, amplifies the first transmission signal, and outputs the first transmission signal from the second output terminal 122. The first transmission signal is a transmission signal in a first frequency band corresponding to the 2G standard. The lower limit frequency of the first frequency band is higher than the upper limit frequency of the fourth frequency band. The second input terminal 121 is connected to the mid-band signal input terminal T12. The second output terminal 122 is connected to the second matching circuit 15.

The third power amplifier 13 has a third input terminal 131 and a third output terminal 132. The third power amplifier 13 receives the input of a third transmission signal in the low band specified by the 4G or 5G standard via the third input terminal 131, amplifies the third transmission signal, and outputs the third transmission signal from the third output terminal 132. The third transmission signal is a transmission signal in a third frequency band corresponding to the 4G or 5G standard. The third input terminal 131 is connected to the low-band second signal input terminal T13. The third output terminal 132 is connected to a third matching circuit 16.

The frequency band (first frequency band) of the first transmission signal includes, for example, the frequency bands of GSM 1800 and GSM 1900. The frequency band (third frequency band) of the third transmission signal includes the frequency band of Band 8 specified by the LTE standard. The frequency band (fourth frequency band) of the fourth transmission signal includes, for example, the frequency bands of GSM 850 and GSM 900.

(3.2.2) Matching Circuit

The first matching circuit 14 is provided between the first output terminal 112 of the first power amplifier 11 and a selection terminal 191 of the low-band antenna switch 19. The first matching circuit 14 is an impedance matching circuit for matching the output impedance of a circuit antecedent to the first matching circuit 14 to the input impedance of a circuit subsequent to the first matching circuit 14. More specifically, the first matching circuit 14 adjusts the impedance at the fundamental frequency of the fourth transmission signal on the antenna terminal T10 side as seen by the first power amplifier 11 (the output impedance of the first power amplifier 11) to, for example, 50Ω.

The second matching circuit 15 is provided between the second output terminal 122 of the second power amplifier 12 and the bypass terminal T15. The second matching circuit 15 is an impedance matching circuit for matching the output impedance of a circuit antecedent to the second matching circuit 15 to the input impedance of a circuit subsequent to the second matching circuit 15. More specifically, the second matching circuit 15 adjusts the impedance at the fundamental frequency of the first transmission signal on the bypass terminal T15 side as seen by the second power amplifier 12 (the output impedance of the second power amplifier 12) to, for example, 50Ω.

The third matching circuit 16 is provided between the third output terminal 132 of the third power amplifier 13 and each of selection terminals 192 to 194 of the low-band antenna switch 19. The first radio-frequency circuit 1 includes the low-band band change-over switch 17 and the multiple (three in the drawing) low-band duplexers 81, 82, and 83 between the third matching circuit 16 and the low-band antenna switch 19. Specifically, the third matching circuit 16 is therefore provided between the third output terminal 132 of the third power amplifier 13 and the low-band band change-over switch 17. The third matching circuit 16 is an impedance matching circuit for matching the output impedance of a circuit antecedent to the third matching circuit 16 to the input impedance of a circuit subsequent to the third matching circuit 16. More specifically, the third matching circuit 16 adjusts the impedance at the fundamental frequency of the second transmission signal on the antenna terminal T10 side as seen by the third power amplifier 13 (the output impedance of the third power amplifier 13) to, for example, 50Ω.

(3.2.3) Antenna Switch

The low-band antenna switch 19 is provided between the low-band antenna terminal T10 and each of the first output terminal 112 of the first power amplifier 11 and the third output terminal 132 of the third power amplifier 13. As illustrated in FIG. 2, the low-band antenna switch 19 has a single common terminal 190 and the multiple (four in the drawing) selection terminals 191 to 194. The common terminal 190 of the low-band antenna switch 19 is connected to the low-band antenna terminal T10.

The low-band antenna switch 19 is provided between the antenna terminal T10 and each of the multiple (three in the drawing) low-band duplexers 81 to 83. In the low-band antenna switch 19, the selection terminal 191 that is one of the four selection terminals 191 to 194 is connected to the first matching circuit 14 and the other three selection terminals 192 to 194 are connected to the multiple duplexers 81 toe 83, respectively. The low-band antenna switch 19 is, for example, a switch IC (integrated circuit).

(3.2.4) Duplexer

The multiple (three in the drawing) low-band duplexers 81, 82, and 83 include transmission filters 811, 821, and 831 and reception filters 812, 822, and 832, respectively. The duplexer 81 has an antenna-side terminal Ax1, a transmission terminal Tx1, and a reception terminal Rx1. The duplexer 82 has an antenna-side terminal Ax2, a transmission terminal Tx2, and a reception terminal Rx2. The duplexer 83 has an antenna-side terminal Ax3, a transmission terminal Tx3, and a reception terminal Rx3.

Each of the transmission filters 811, 821, and 831 passes signals in a transmission frequency band and attenuates signals in frequency bands other than the transmission frequency band. Each of the reception filters 812, 822, and 832 passes signals in a reception frequency band and attenuates signals in frequency bands other than the reception frequency band. The transmission filters 811, 821, and 831 and the reception filters 812, 822, and 832 are, for example, SAW filters.

The multiple low-band duplexers 81, 82, 83 have different transmission frequency bands and different reception frequency bands.

The input terminal of the transmission filter 811 is used as the transmission terminal Tx1 in the low-band duplexer 81 and is connected to a selection terminal 171 of the low-band band change-over switch 17. The input terminal of the transmission filter 821 is used as the transmission terminal Tx2 in the low-band duplexer 82 and is connected to a selection terminal 172 of the low-band band change-over switch 17. The input terminal of the transmission filter 831 is used as the transmission terminal Tx3 In the low-band duplexer 83 and is connected to a selection terminal 173 of the low-band band change-over switch 17. The output terminal of the reception filter 812 is used as the reception terminal Rx1 in the low-band duplexer 81 and is connected to the low-band signal output terminal T81. The output terminal of the reception filter 822 is used as the reception terminal Rx2 in the duplexer 82 and is connected to the low-band signal output terminal T82. The output terminal of the reception filter 832 is used as the reception terminal Rx3 in the duplexer 83 and is connected to the low-band signal output terminal T83.

A terminal (ANT terminal) connected to the output terminal of the transmission filter 811 and the input terminal of the reception filter 812 is used as the antenna-side terminal Ax1 in the duplexer 81 and is connected to the selection terminal 192 of the low-band antenna switch 19. A terminal (ANT terminal) connected to the output terminal of the transmission filter 821 and the input terminal of the reception filter 822 is used as the antenna-side terminal Ax2 in the low-band duplexer 82 and is connected to the selection terminal 193 of the low-band antenna switch 19. A terminal (ANT terminal) connected to the output terminal of the transmission filter 831 and the input terminal of the reception filter 832 is used as the antenna-side terminal Ax3 in the low-band duplexer 83 and is connected to the selection terminal 194 of the low-band antenna switch 19.

(3.2.5) Band Change-Over Switch

The low-band band change-over switch 17 is provided between the third output terminal 132 of the third power amplifier 13 and each of the transmission terminals Tx1 to Tx3 of the multiple low-band duplexers 81 to 83. The low-band band change-over switch 17 connects one of the multiple low-band duplexers 81 to 83 to the third output terminal 132 of the third power amplifier 13.

(3.2.6) Signal Terminal

The low-band antenna terminal T10 is connected to the antenna 200.

The bypass terminal T15 is connected to the second output terminal 122 of the second power amplifier 12. More specifically, the bypass terminal T15 is connected to the second output terminal 122 of the second power amplifier 12 via the second matching circuit 15.

The low-band first signal input terminal T11, the mid-band signal input terminal T12, the low-band second signal input terminal T13, and the multiple low-band signal output terminals T81, T82, and T83 are connected to an RF signal processing circuit 402 to be described below in the signal processing circuit 401.

(3.2.7) Control Circuit

For example, the control circuit 100 receives a control signal from a baseband signal processing circuit 403 (see FIG. 2) and controls each of the first power amplifier 11, the second power amplifier 12, the third power amplifier 13, the low-band antenna switch 19, and the low-band band change-over switch 17 in accordance with the control signal. The control circuit 100 is, for example, an IC.

(3.3) Signal Processing Circuit

As illustrated in FIG. 2, the signal processing circuit 401 includes the RF signal processing circuit 402 and the baseband signal processing circuit 403.

(3.3.1) RF Signal Processing Circuit

The RF signal processing circuit 402 is connected to the first radio-frequency circuit 1 and the second radio-frequency circuit 2. More specifically, the RF signal processing circuit 402 is connected to the low-band first signal input terminal T11, the mid-band signal input terminal T12, the low-band second signal input terminal T13, and the multiple low-band signal output terminals T81, T82, and T83 of the first radio-frequency circuit 1. The RF signal processing circuit 402 is also connected to the mid-band signal input terminal T21 and the multiple mid-band signal output terminals T31, T32, and T33 of the second radio-frequency circuit 2.

The RF signal processing circuit 402 is, for example, an RFIC (radio frequency integrated circuit). The RF signal processing circuit 402 performs signal processing upon radio-frequency signals (reception signals) output from the multiple low-band signal output terminals T81, T82, and T83 and the multiple mid-band signal output terminals T31, T32, and T33.

The RF signal processing circuit 402 performs signal processing such as down-conversion upon a radio-frequency signal (reception signal) input from the antenna 200 via the first radio-frequency circuit 1 or the second radio-frequency circuit 2 and outputs a reception signal, which has been generated as a result of the signal processing, to the baseband signal processing circuit 403.

The RF signal processing circuit 402 performs signal processing such as up-conversion upon a transmission signal output from the baseband signal processing circuit 403 and outputs a transmission signal (radio-frequency signal), which has been subjected to the signal processing, to the first radio-frequency circuit 1 or the second radio-frequency circuit 2.

(3.3.2) Baseband Signal Processing Circuit

The baseband signal processing circuit 403 is, for example, a BBIC (baseband integrated circuit). A reception signal processed by the baseband signal processing circuit 403 is used for image display as an image signal or for telephone conversation as an audio signal. For example, the baseband signal processing circuit 403 performs predetermined signal processing upon a transmission signal input from outside the communication device 400.

(3.4) Bypass Path

The bypass path 180 connects the bypass terminal T15 and the mid-band transmission path MT1. More specifically, the bypass path 180 connects the bypass terminal T15 and the relay terminal T25 connected to the mid-band transmission path MT1. That is, the bypass path 180 connects the bypass terminal T15 functioning as the output terminal of the second transmission signal and the relay terminal T25. The bypass path 180 includes, for example, a wiring conductor on a printed wiring board provided with the first radio-frequency circuit 1 and the second radio-frequency circuit 2. In this case, the communication device 400 includes the printed wiring board as a constituent element thereof.

(4) Operation of Radio-Frequency Circuit

Next, the operation of the radio-frequency circuit 2 according to this embodiment will be described. The radio-frequency circuit 2 according to this embodiment has a first transmission mode and a second transmission mode. In the first transmission mode, the first transmission signal in the mid-band (first frequency band) specified by the 2G standard is transmitted. That is, in the first transmission mode, the radio-frequency circuit 2 performs communication using the first frequency band corresponding to the 2G standard. In the second transmission mode, the second transmission signal in the mid-band (second frequency band) specified by the 4G or 5G standard is transmitted. That is, in the second transmission mode, the radio-frequency circuit 2 performs communication using the second frequency band corresponding to the 4G or 5G standard. The first transmission mode and the second transmission mode will be described below.

(4.1) First Transmission Mode

As described above, the radio-frequency circuit 2 transmits the first transmission signal in the first transmission mode. In this case, the first transmission signal is output from the radio-frequency circuit 1 to the radio-frequency circuit 2 via the bypass terminal T15, the bypass path 180, and the relay terminal T25. In this embodiment, the first frequency band of the first transmission signal includes the frequency bands of GSM 1800 and GSM 1900 as described above.

In the radio-frequency circuit 2, the control circuit 20 changes the cut-off frequency of the variable low-pass filter 25 to allow the first transmission signal to pass through the variable low-pass filter 25 in the first transmission mode. More specifically, the control circuit 20 changes the electrostatic capacitances of the variable capacitors C1 to C3 by changing voltages to be applied to the variable capacitors C1 to C3. As a result, the cut-off frequency of the variable low-pass filter 25 is changed to, for example, 2000 MHz. Accordingly, in this case, the first transmission signal can pass through the variable low-pass filter 25.

The first transmission signal that has passed through the variable low-pass filter 25 passes through the mid-band antenna switch 24 and outputs from the mid-band antenna terminal T20.

(4.2) Second Transmission Mode

The radio-frequency circuit 2 transmits the second transmission signal in the second transmission mode as described above. At that time, the radio-frequency circuit 1 transmits the third transmission signal. That is, in the second transmission mode, the second transmission signal and the third transmission signal are simultaneously transmitted by the radio-frequency circuits 2 and 1, respectively (carrier aggregation is performed).

The third transmission signal is a transmission signal in the low band (third frequency band) specified by the 4G or 5G standard. The second transmission signal is a transmission signal in the mid-band (second frequency band) specified by the 4G or 5G standard. The frequency band of the third transmission signal includes the frequency band of Band 8 specified by the LTE standard. The frequency band of the second transmission signal includes the frequency band of Band 3 specified by the LTE standard. The first frequency band includes the frequency bands of GSM 1800 and GSM 1900 as described above. Accordingly, the harmonic of the third transmission signal is in the first frequency band.

The third transmission signal passes through the transmission filter 811 in the low-band duplexer 81 and outputs from the low-band antenna terminal T10. The second transmission signal passes through the transmission filter 311 in the mid-band duplexer 31 and outputs from the mid-band antenna terminal T20.

The frequency of the harmonic of the third transmission signal is in the first frequency band as described above. Accordingly, the harmonic of the third transmission signal may hop onto a transmission path for the mid-band specified by the 2G standard that is a transmission path for the first transmission signal. The harmonic of the third transmission signal, which has hopped onto the transmission path for the mid-band specified by the 2G standard, passes through the bypass path 180 and inputs to the radio-frequency circuit 2 from the relay terminal T25.

When the cut-off frequency of the variable low-pass filter 25 is 2000 MHz, the second harmonic (1800 MHz) that is one of harmonics of the third transmission signal may pass through the variable low-pass filter 25 and leak into the reception filter 312 in the mid-band duplexer 31. As a result, a problem may arise where the sensitivity of the reception filter 312 degrades.

To solve the above problem, the radio-frequency circuit 2 according to this embodiment has a configuration in which the cut-off frequency of the variable low-pass filter 25 can be changed. Specifically, the control circuit 20 in the radio-frequency circuit 2 changes the cut-off frequency of the variable low-pass filter 25 to attenuate the harmonic of the third transmission signal. More specifically, the control circuit 20 changes the electrostatic capacitances of the variable capacitors C1 to C3 by changing voltages to be applied to the variable capacitors C1 to C3. The cut-off frequency of the variable low-pass filter 25 is changed to, for example, 1200 MHz. Accordingly, in this case, the variable low-pass filter 25 can attenuate the harmonic of the third transmission signal.

For example, it is assumed that the third frequency band of the third transmission signal is Band 12 specified by the LTE standard and the second transmission frequency band of the second transmission signal is Band 4 specified by the LTE standard. In this case, to cut the third harmonic that is one of the harmonics of the third transmission signal, the control circuit 20 changes voltages to be applied to the variable capacitors C1 to C3 such that the cut-off frequency of the variable low-pass filter 25 is 2100 MHz. As a result, the third harmonic of the third transmission signal can be prevented from leaking into the reception filter 312 that passes a reception signal in Band 4. This can lead to the suppression of sensitivity degradation of the reception filter 312.

(5) Effects

There has been a demand for a communication device including a low-band radio-frequency circuit (another radio-frequency circuit) that transmits a transmission signal in the low band specified by the 2G standard and a transmission signal (the third transmission signal) in the low band (third frequency band) specified by the 4G or 5G standard and a mid-band radio-frequency circuit for the mid-band (second frequency band) specified by the 4G or 5G standard.

There has also been a demand that, in the above communication device, a transmission circuit for transmitting a transmission signal (the first transmission signal) in the mid-band (first frequency band) specified by the 2G standard is provided in the low-band radio-frequency circuit smaller in size than the mid-band radio-frequency circuit.

In this case, there is a need to bypass a signal path in a transmission circuit for the mid-band specified by the 2G standard to an antenna switch in the mid-band radio-frequency circuit in the communication device.

However, for example, in the case where Band 8 is set as the third frequency band of the low-band radio-frequency circuit, a reception circuit (reception filter) for Band 3 is provided in the mid-band radio-frequency circuit, and a transmission signal in Band 8 is transmitted from the low-band radio-frequency circuit, the frequency of the second harmonic of the transmission signal in Band 8 and the mid-band specified by the 2G standard overlap and (unwanted radiation of) the harmonic hops onto the transmission circuit for the mid-band specified by the 2G standard. The harmonic of the transmission signal in Band 8 may be transmitted to the reception circuit via a bypass path and degrade the reception performance of the reception circuit.

The radio-frequency circuit 2 according to this embodiment has the following configuration with which the above problem is solved.

That is, the radio-frequency circuit 2 performs communication using the first frequency band corresponding to the 2G standard and the second frequency band corresponding to the 4G or 5G standard. The radio-frequency circuit 2 includes the mid-band antenna terminal T20, the relay terminal T25, the transmission filter 311, the reception filter 312, the variable low-pass filter 25, and the switch 24. The first transmission signal in the first frequency band is input to the relay terminal T25. The transmission filter 311 passes the second transmission signal in the second frequency band. The reception filter 312 passes a reception signal in the second frequency band. The passband of the variable low-pass filter 25 can be changed. The switch 24 can switch between the state in which the variable low-pass filter 25 is connected to the antenna terminal T20 and the state in which the transmission filter 311 is connected to the antenna terminal T20. The variable low-pass filter 25 passes the first transmission signal input via the relay terminal T25 in communication using the first frequency band. When another harmonic circuit (1) performs communication using the third frequency band, the variable low-pass filter 25 attenuates the harmonic input via the relay terminal T25 among the harmonics of the third transmission signal in the third frequency band generated at the time of transmission of the third transmission signal. The third frequency band is lower than the first frequency band and corresponds to the 4G or 5G standard.

In the radio-frequency circuit 2 according to this embodiment, the variable low-pass filter 25 passes the first transmission signal in communication using the first frequency band. On the other hand, the variable low-pass filter 25 attenuates the harmonic of the third transmission signal in the third frequency band when another radio-frequency circuit (1) performs communication using the third frequency band. As a result, the harmonic of the third transmission signal from the radio-frequency circuit 1 can be prevented from leaking into the reception filter 312. This can lead to suppression of sensitivity degradation of the reception filter 312.

For example, it is assumed that the second frequency band is Band 3, the third frequency band is Band 8, and the harmonic of Band 8 is included in the first frequency band. In this case, even if carrier aggregation is performed using Band 8 and Band 3, the variable low-pass filter 25 can attenuate the harmonic of a signal in Band 8. As a result, the harmonic of a signal in Band 8 can be prevented from leaking into the reception filter 312. This can lead to suppression of sensitivity degradation of the reception filter 312. That is, with the radio-frequency circuit 2 according to this embodiment, the sensitivity of the reception filter 312 for receiving a reception signal in the second frequency band corresponding to the 4G or 5G standard can be prevented from being degraded by the harmonic of the third transmission signal in the third frequency region corresponding to the 4G or 5G standard.

(6) Modification

The above embodiment is a merely example embodiment of the present disclosure. Various changes may be made to the above embodiment in accordance with a design of the present disclosure.

The transmission filter 811 and the reception filter 812 included in the duplexer 81, the transmission filter 821 and the reception filter 822 included in the duplexer 82, and the transmission filter 831 and the reception filter 832 included in the duplexer 83 are SAW filters in the above embodiment, but may be, for example, BAW (bulk acoustic wave) filters or dielectric filters.

The transmission filter 311 and the reception filter 312 included in the mid-band duplexer 31, the transmission filter 321 and the reception filter 322 included in the mid-band duplexer 32, and the transmission filter 331 and the reception filter 332 included in the mid-band duplexer 33 are SAW filters in the above embodiment, but may be, for example, BAW filters or dielectric filters.

The control circuit 100 is included in the radio-frequency circuit 1 in the above embodiment, but does not necessarily have to be included in the radio-frequency circuit 1. The control circuit 20 is included in the radio-frequency circuit 2 in the above embodiment, but does not necessarily have to be included in the radio-frequency circuit 2. That is, the control circuit 100 and the control circuit 20 need to be included in the communication device 400, but do not necessarily have to be included in the radio-frequency circuits 1 and 2, respectively.

The radio-frequency circuit 2 is a mid-band radio-frequency circuit in the above embodiment, but may be, for example, a high-band radio-frequency circuit, an ultra-high-band radio-frequency circuit, or the combination thereof (including a mid-band radio-frequency circuit).

The control circuit 20 changes the cut-off frequency of the variable low-pass filter 25 in the above embodiment. However, in the case where a power amplifier controller for controlling the fourth power amplifier 21 is provided in the radio-frequency circuit 2, the power amplifier controller may change the cut-off frequency of the variable low-pass filter 25. Alternatively, the signal processing circuit 401 described above may change the cut-off frequency of the variable low-pass filter 25.

In the above embodiment, the electrostatic capacitances of the variable capacitors C1 to C3 are changed by changing voltages to be applied to the variable capacitors C1 to C3. As a result, the cut-off frequency of the variable low-pass filter 25 is changed, but may be changed in a different way. For example, a plurality of series circuits each including a capacitor and a switch are connected between the transmission path MT1 and the ground. The entire electrostatic capacitance may be changed by changing the connection state of each of the switches. Each of the switches may be connected between the transmission path MT1 and a capacitor or between a capacitor and the ground. Also in this case, the cut-off frequency of the variable low-pass filter 25 can be changed by changing the entire electrostatic capacitance.

Aspects

The following aspects are disclosed in this specification.

A radio-frequency circuit (2) according to a first aspect performs communication using a first frequency band corresponding to the 2G standard and communication using a second frequency band corresponding to the 4G or 5G standard. The radio-frequency circuit (2) includes an antenna terminal (T20), a relay terminal (T25), a transmission filter (311), a reception filter (312), a variable low-pass filter (25), and a switch (24). A first transmission signal in the first frequency band is input to the relay terminal (T25). The transmission filter (311) is configured to pass a second transmission signal in the second frequency band. The reception filter (312) is configured to pass a reception signal in the second frequency band. The variable low-pass filter (25) has a changeable passband. The switch (24) can switch a state in which the variable low-pass filter (25) is connected to the antenna terminal (T20) and a state in which the transmission filter (311) is connected to the antenna terminal (T20). In the communication using the first frequency band, the variable low-pass filter (25) passes the first transmission signal input via the relay terminal (T25). When another harmonic circuit (1) performs communication using a third frequency band, the variable low-pass filter (25) attenuates, among harmonics of a third transmission signal in the third frequency band which are generated when the third transmission signal is transmitted, a harmonic input via the relay terminal (T25). The third frequency band is lower than the first frequency band and corresponds to the 4G or 5G standard.

With this aspect, the sensitivity of the reception filter (312) for receiving a reception signal in the second frequency band corresponding to the 4G or 5G standard can be prevented from being degraded by the harmonic of the third transmission signal in the third frequency region corresponding to the 4G or 5G standard.

In the radio-frequency circuit (2) according to a second aspect, an output terminal (T15) for the first transmission signal and the relay terminal (T25) are connected in the first aspect.

With this aspect, the first transmission signal can be input to the radio-frequency circuit (2).

In the radio-frequency circuit (2) according to a third aspect, a cut-off frequency of the variable low-pass filter (25) is changed in the communication using the first frequency band and the communication using the third frequency band in the first or second aspect.

With this aspect, the radio-frequency circuit (2) can pass the first transmission signal input thereto in communication using the first frequency band. In communication using the third frequency band, the variable low-pass filter (25) can attenuate the harmonic of the third transmission signal input to the radio-frequency circuit (2).

In the radio-frequency circuit (2) according to a fourth aspect, the transmission filter (311) and the reception filter (312) form a duplexer (31) in any one of the first to third aspects.

In the radio-frequency circuit (2) according to a fifth aspect, the first frequency band includes frequency bands of GSM 1800 and GSM 1900, the second frequency band includes a frequency band of Band 3 specified by the LTE standard or an n3 frequency band specified by 5G NR, and the third frequency band includes a frequency band of Band 8 specified by the LTE standard or an n8 frequency band specified by 5G NR in any one of the first to fourth aspects.

With this aspect, the sensitivity of the reception filter (312) for receiving a reception signal in the second frequency band corresponding to the 4G or 5G standard can be prevented from being degraded by the harmonic of the third transmission signal in the third frequency region corresponding to the 4G or 5G standard.

A communication device (400) according to a sixth aspect includes the radio-frequency circuit (2) according to any one of the first to fifth aspects and the other radio-frequency circuit (1).

With this aspect, the sensitivity of the reception filter (312) for receiving a reception signal in the second frequency band corresponding to the 4G or 5G standard can be prevented from being degraded by the harmonic of the third transmission signal in the third frequency region corresponding to the 4G or 5G standard.

REFERENCE SIGNS LIST

1 radio-frequency circuit (another radio-frequency circuit)
2 second radio-frequency circuit (radio-frequency circuit)
11 first power amplifier
12 second power amplifier
13 third power amplifier
14 first matching circuit
15 second matching circuit
16 third matching circuit
17 low-band band change-over switch
19 antenna switch
20 control circuit
21 fourth power amplifier
22 band change-over switch
24 mid-band antenna switch (switch)
25 variable low-pass filter
31 to 33 duplexer
81 to 83 duplexer
100 control circuit
111 first input terminal
121 second input terminal
131 third input terminal
112 first output terminal
122 second output terminal
132 third output terminal
170 common terminal
171 to 173 selection terminal
180 bypass path
190 common terminal
191 to 194 selection terminal
200 antenna
211 fourth input terminal
212 fourth output terminal
220 common terminal
221 to 223 selection terminal
240 common terminal
241 to 244 selection terminal
250 radio-frequency front-end circuit
300 diplexer
301 and 302 filter
311, 321, and 331 transmission filter
312, 322, and 332 reception filter
400 communication device
401 signal processing circuit
402 RF signal processing circuit
403 baseband signal processing circuit
811, 821, and 831 transmission filter
812, 822, and 832 reception filter
Ax1 to Ax6 antenna-side terminal
C1 to C3 variable capacitor
L1 to L5 inductor
MR1 reception path
MT1 transmission path
Rx1 to Rx6 reception terminal
T10 low-band antenna terminal
T11 to T13 signal input terminal
T15 bypass terminal (output terminal)
T20 mid-band antenna terminal
T25 relay terminal
T31 to T33 signal output terminal
T81 to T83 signal output terminal
Tx1 to Tx6 transmission terminal

The invention claimed is:

1. A radio-frequency circuit configured to perform communication in a first frequency band corresponding to a 2G standard and communication in a second frequency band corresponding to a 4G or 5G standard, comprising:
an antenna terminal;
a relay terminal to which a first transmission signal in the first frequency band is input;

a transmission filter configured to pass a second transmission signal in the second frequency band;

a reception filter configured to pass a reception signal in the second frequency band;

a variable low-pass filter having a changeable passband; and a switch configured to selectively connect the antenna terminal to the variable low-pass filter and the transmission filter, wherein, when the radio-frequency circuit is configured to perform communication in the first frequency band, the variable low-pass filter is configured to pass the first transmission signal input via the relay terminal, and wherein, when another radio-frequency circuit performs communication using a third frequency, the variable low-pass filter is configured to attenuate a harmonic input via the relay terminal, wherein the third frequency band is lower in frequency than the first frequency band, and corresponds to the 4G or 5G standard, and wherein the harmonic input via the relay terminal is an harmonic of a third transmission signal in the third frequency band generated when the third transmission signal is transmitted.

2. The radio-frequency circuit according to claim 1, wherein an output terminal of the other radio-frequency circuit that is configured to output the first transmission signal is connected to the relay terminal.

3. The radio-frequency circuit according to claim 1, wherein a cut-off frequency of the variable low-pass filter is configured to change when the radio-frequency circuit is configured to perform the communication in the first frequency band and the communication in the third frequency band.

4. The radio-frequency circuit according to claim 2, wherein a cut-off frequency of the variable low-pass filter is configured to change when the radio-frequency circuit is configured to perform the communication in the first frequency band and the communication in the third frequency band.

5. The radio-frequency circuit according to claim 1, wherein the transmission filter and the reception filter form a duplexer.

6. The radio-frequency circuit according to claim 2, wherein the transmission filter and the reception filter form a duplexer.

7. The radio-frequency circuit according to claim 3, wherein the transmission filter and the reception filter form a duplexer.

8. The radio-frequency circuit according to claim 1,
wherein the first frequency band includes frequency bands of GSM 1800 and GSM 1900,
wherein the second frequency band includes a frequency band of Band 3 specified by an LTE standard or an n3 frequency band specified by 5G NR, and
wherein the third frequency band includes a frequency band of Band 8 specified by the LTE standard or an n8 frequency band specified by 5G NR.

9. The radio-frequency circuit according to claim 2,
wherein the first frequency band includes frequency bands of GSM 1800 and GSM 1900,
wherein the second frequency band includes a frequency band of Band 3 specified by an LTE standard or an n3 frequency band specified by 5G NR, and
wherein the third frequency band includes a frequency band of Band 8 specified by the LTE standard or an n8 frequency band specified by 5G NR.

10. The radio-frequency circuit according to claim 3,
wherein the first frequency band includes frequency bands of GSM 1800 and GSM 1900,
wherein the second frequency band includes a frequency band of Band 3 specified by an LTE standard or an n3 frequency band specified by 5G NR, and
wherein the third frequency band includes a frequency band of Band 8 specified by the LTE standard or an n8 frequency band specified by 5G NR.

11. The radio-frequency circuit according to claim 5,
wherein the first frequency band includes frequency bands of GSM 1800 and GSM 1900,
wherein the second frequency band includes a frequency band of Band 3 specified by an LTE standard or an n3 frequency band specified by 5G NR, and
wherein the third frequency band includes a frequency band of Band 8 specified by the LTE standard or an n8 frequency band specified by 5G NR.

12. A communication device comprising:
the radio-frequency circuit according to claim 1, and
the other radio-frequency circuit.

13. A communication device comprising:
the radio-frequency circuit according to claim 2, and
the other radio-frequency circuit.

14. A communication device comprising:
the radio-frequency circuit according to claim 3, and
the other radio-frequency circuit.

15. A communication device comprising:
the radio-frequency circuit according to claim 5, and
the other radio-frequency circuit.

16. A communication device comprising:
the radio-frequency circuit according to claim 8, and
the other radio-frequency circuit.

* * * * *